United States Patent
Hilton et al.

(10) Patent No.: US 9,360,082 B2
(45) Date of Patent: Jun. 7, 2016

(54) HIGH SPEED FLYWHEEL

(75) Inventors: Jonathan James Robert Hilton, Yardley Hastings (GB); Douglas Isaac Lascelles Cross, Milton Keynes (GB)

(73) Assignee: Flybird Automotive Limited (GB)

( * ) Notice: Subject to any disclaimer, the term of this patent is extended or adjusted under 35 U.S.C. 154(b) by 0 days.

(21) Appl. No.: 14/001,009

(22) PCT Filed: Feb. 28, 2012

(86) PCT No.: PCT/GB2012/050448
§ 371 (c)(1),
(2), (4) Date: Sep. 12, 2013

(87) PCT Pub. No.: WO2012/123710
PCT Pub. Date: Sep. 20, 2012

(65) Prior Publication Data
US 2014/0033859 A1    Feb. 6, 2014

(30) Foreign Application Priority Data
Mar. 16, 2011  (GB) .................................. 1104406.2

(51) Int. Cl.
*F16F 15/31* (2006.01)
*F16C 27/06* (2006.01)
*F16F 15/315* (2006.01)
*F16C 33/66* (2006.01)

(52) U.S. Cl.
CPC ............... *F16F 15/315* (2013.01); *F16C 27/06* (2013.01); *F16C 27/066* (2013.01); *F16C 33/6659* (2013.01); *F16F 15/3156* (2013.01); *Y10T 74/2132* (2015.01)

(58) Field of Classification Search
CPC ...... F16C 19/163; F16C 19/18; F16C 19/181; F16C 27/00; F16C 27/04; F16C 27/06; F16C 27/066; F16C 33/6659; F16C 35/07; F16C 35/077; F16F 15/3156; F16F 15/315; Y10T 74/2132
USPC ......... 384/474, 475, 489, 517, 535, 536, 563, 384/569, 581, 582; 74/572.21, 574.4
See application file for complete search history.

(56) References Cited

U.S. PATENT DOCUMENTS

| | | | | |
|---|---|---|---|---|
| 2,414,335 A | * | 1/1947 | Schroeder | 384/536 |
| 2,439,267 A | * | 4/1948 | Shafer | 384/536 |
| 2,992,868 A | * | 7/1961 | Vacha | 384/617 |
| 4,329,000 A | | 5/1982 | Keske | |
| 4,385,845 A | * | 5/1983 | Hoshino | 384/123 |
| 5,253,985 A | * | 10/1993 | Ruetz | 417/407 |

(Continued)

FOREIGN PATENT DOCUMENTS

| | | |
|---|---|---|
| EP | 1970580 | 9/2008 |
| FR | 2839396 | 11/2003 |

(Continued)

*Primary Examiner* — Alan B Waits
(74) *Attorney, Agent, or Firm* — Patti & Malvone Law Group, LLC (57) ABSTRACT

A high speed flywheel system for a vehicle, i.e. capable of running at speeds of 20,000 rpm or greater, the system comprising a flywheel mounted on a shaft and contained within a housing, and at least one bearing arrangement, wherein the bearing arrangement is mounted to the flywheel or the housing via an elastomeric component such as a ring and/or a metalastic bush, thereby to reduce NVH and prevent the resonant modes of the flywheel and housing interfering with one another.

19 Claims, 6 Drawing Sheets

(56) References Cited

U.S. PATENT DOCUMENTS

| | | | |
|---|---|---|---|
| 5,906,164 A * | 5/1999 | Bildtsen | 105/3 |
| 6,630,761 B1 * | 10/2003 | Gabrys | 310/90.5 |
| 6,655,847 B2 * | 12/2003 | Obara et al. | 384/535 |
| 8,038,352 B2 * | 10/2011 | Dodoro et al. | 384/536 |
| 8,807,840 B2 * | 8/2014 | House et al. | 384/476 |
| 2003/0099417 A1 | 5/2003 | Bauer et al. | |
| 2005/0089256 A1 | 4/2005 | Wingett et al. | |
| 2005/0224278 A1 * | 10/2005 | Segawa | 180/444 |
| 2008/0210028 A1 * | 9/2008 | Sato | 74/89.23 |
| 2008/0253710 A1 * | 10/2008 | Dodoro et al. | 384/548 |
| 2011/0081231 A1 * | 4/2011 | Hoelzer et al. | 415/119 |
| 2011/0085753 A1 * | 4/2011 | Tecza | 384/462 |
| 2013/0161114 A1 * | 6/2013 | Bando et al. | 180/443 |

FOREIGN PATENT DOCUMENTS

| | | |
|---|---|---|
| JP | 56153141 | 11/1981 |
| JP | 2000130502 | 5/2000 |
| JP | 2004518091 | 6/2004 |
| JP | 2006242292 | 9/2006 |
| WO | 02/061296 | 8/2002 |

* cited by examiner

HIGH SPEED FLYWHEEL

This invention relates to flywheels, and particularly to a bearing system for a high speed flywheel system for use in a vehicle.

BACKGROUND OF THE INVENTION

High-speed flywheels (e.g. those running at speeds of 20,000 rpm or more) for use as energy storage devices in hybrid vehicles are well known. One of the challenges presented by this technology is Noise, Vibration and Harshness (NVH). The flywheel is often at high speed (and therefore produces the most amount of noise) when the vehicle is at low speed or even stationary with the engine turned off.

Furthermore, although it is possible to separately design a flywheel and a flywheel housing each having no resonant modes within the flywheel operating speed range, when the two components are joined together, the interaction of the flywheel and the housing may produce a multi-body resonance which does occur in within the flywheel operating speed range.

An aim of the present invention is to reduce the effect of NVH on a hybrid system, and which ensures that the natural modes of the flywheel do not interfere with the natural modes of the housing and vice versa, thereby allowing full speed operation of the flywheel without producing damaging resonance.

SUMMARY OF THE INVENTION

Accordingly, there is provided a high speed flywheel system comprising a flywheel mounted on a shaft, and a housing, the shaft being mounted on the housing via two primary bearing arrangements, each primary bearing arrangement having an associated first elastomeric component and one of the primary bearing arrangements additionally having an associated second elastomeric component, wherein the first elastomeric components are arranged to provide radial restraint for the shaft and the second elastomeric component is arranged to provide axial restraint for the shaft; the system further comprising an oil transmission passage comprising a channel in the housing to allow oil to be fed to at least one of the primary bearing arrangements via the oil transmission passage.

There is also provided a primary bearing arrangement comprising: at least one bearing: at least one first elastomeric component; at least one second elastomeric component; and an oil transmission passage comprising a channel to allow oil to be fed to the at least one bearing via the oil transmission passage, wherein the primary bearing arrangement is arranged for use in a high speed flywheel system comprising a housing and a flywheel mounted on a shaft, wherein the at least one first elastomeric component is arranged to provide radial restraint for the shaft and wherein the at least one second elastomeric component is arranged to provide axial restraint for the shaft.

There is also provided a high speed flywheel system comprising a flywheel mounted on a shaft, and a housing, the shaft being mounted on the housing via two primary bearing arrangements, each primary bearing arrangement having an associated first elastomeric component and one of the primary bearing arrangements additionally having an associated second elastomeric component, wherein the first elastomeric components are arranged to constrain radial movement of the shaft and the second elastomeric component is arranged to constrain axial movement of the shaft; the system further comprising an oil transmission passage comprising a channel in the housing to allow oil to be fed to at least one of the primary bearing arrangements via the oil transmission passage.

There is also provided a high speed flywheel system comprising a flywheel mounted on a shaft, and a housing, the shaft being mounted on the housing via two primary bearing arrangements, each primary bearing arrangement having an associated first elastomeric component and one of the primary bearing arrangements additionally having an associated second elastomeric component, wherein the first elastomeric components are mounted for radial compression with respect to the shaft and the second elastomeric component is mounted for axial compression with respect to the shaft; the system further comprising an oil transmission passage comprising a channel in the housing to allow oil to be fed to at least one of the primary bearing arrangements via the oil transmission passage.

An advantage of the present invention is that the source of the vibration (the high-speed flywheel) is isolated from other parts of the hybrid system which may be excited by the vibration and therefore cause noise. Furthermore, the interaction of resonant modes of the flywheel and of the housing is prevented.

BRIEF DESCRIPTION OF THE FIGURES

An embodiment of the present invention will now be described by way of example and with reference to the accompanying drawings in which.

and

DETAILED DESCRIPTION

Figure 1:
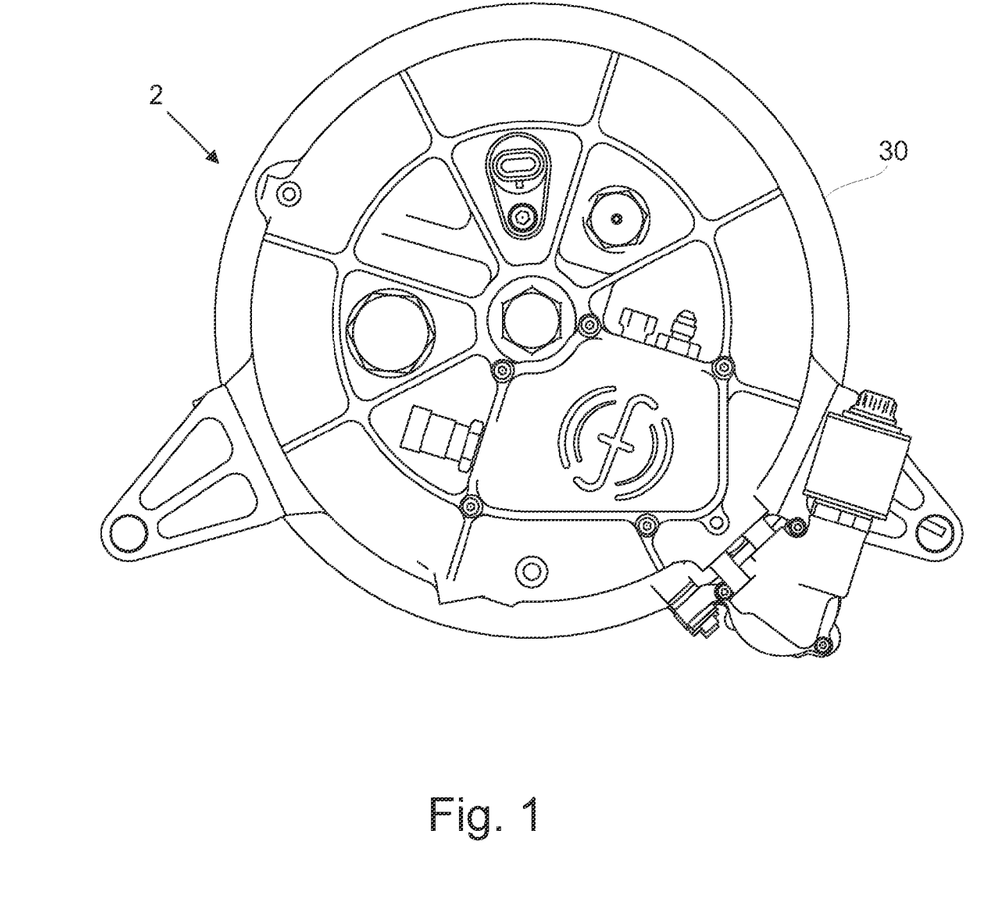
FIG. 1 is a top view of a system in accordance with a first embodiment of the present invention.
Figure 2:
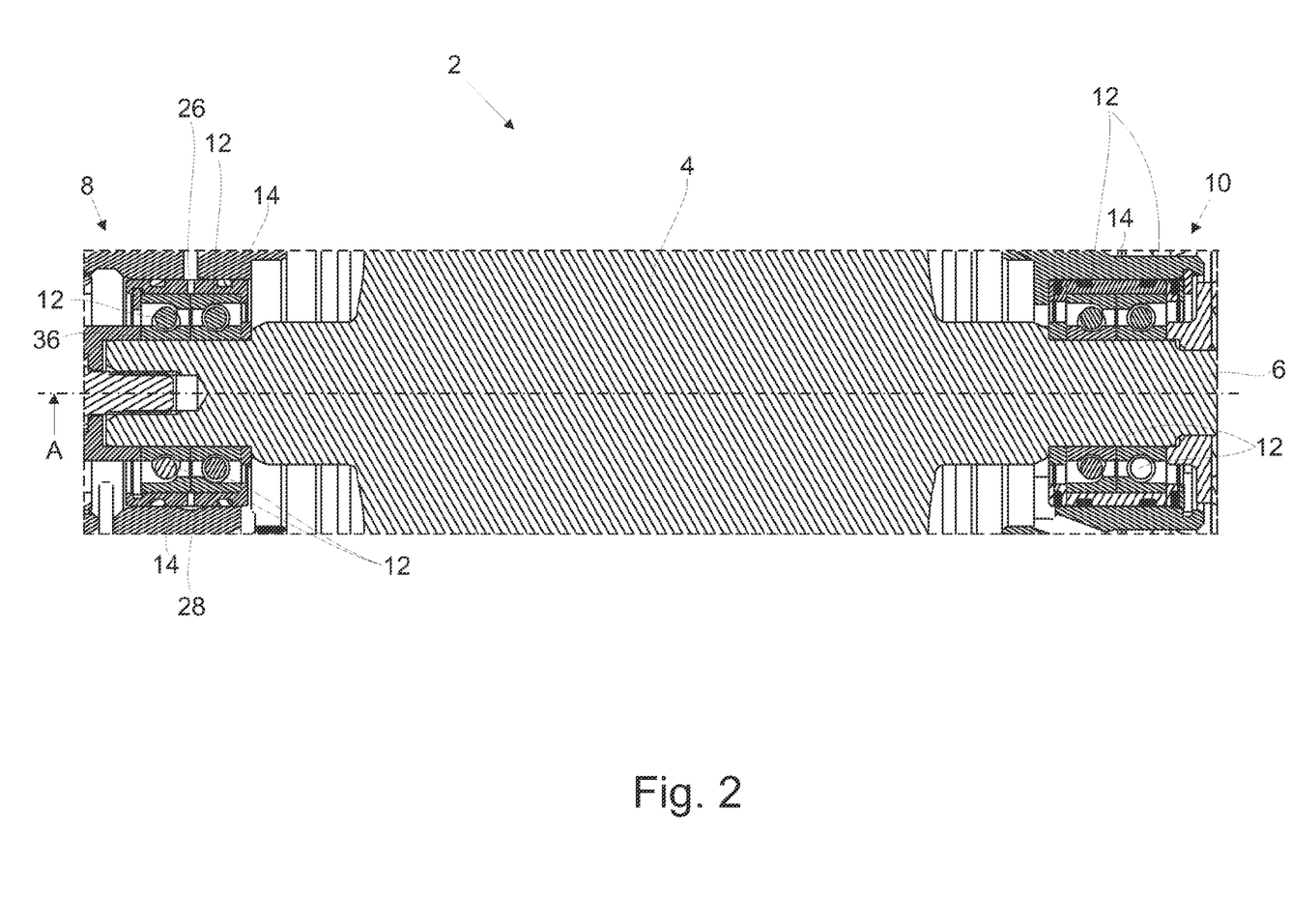
FIG. 2 is a partial cross-sectional view of the system of FIG. 1.
Figure 3:
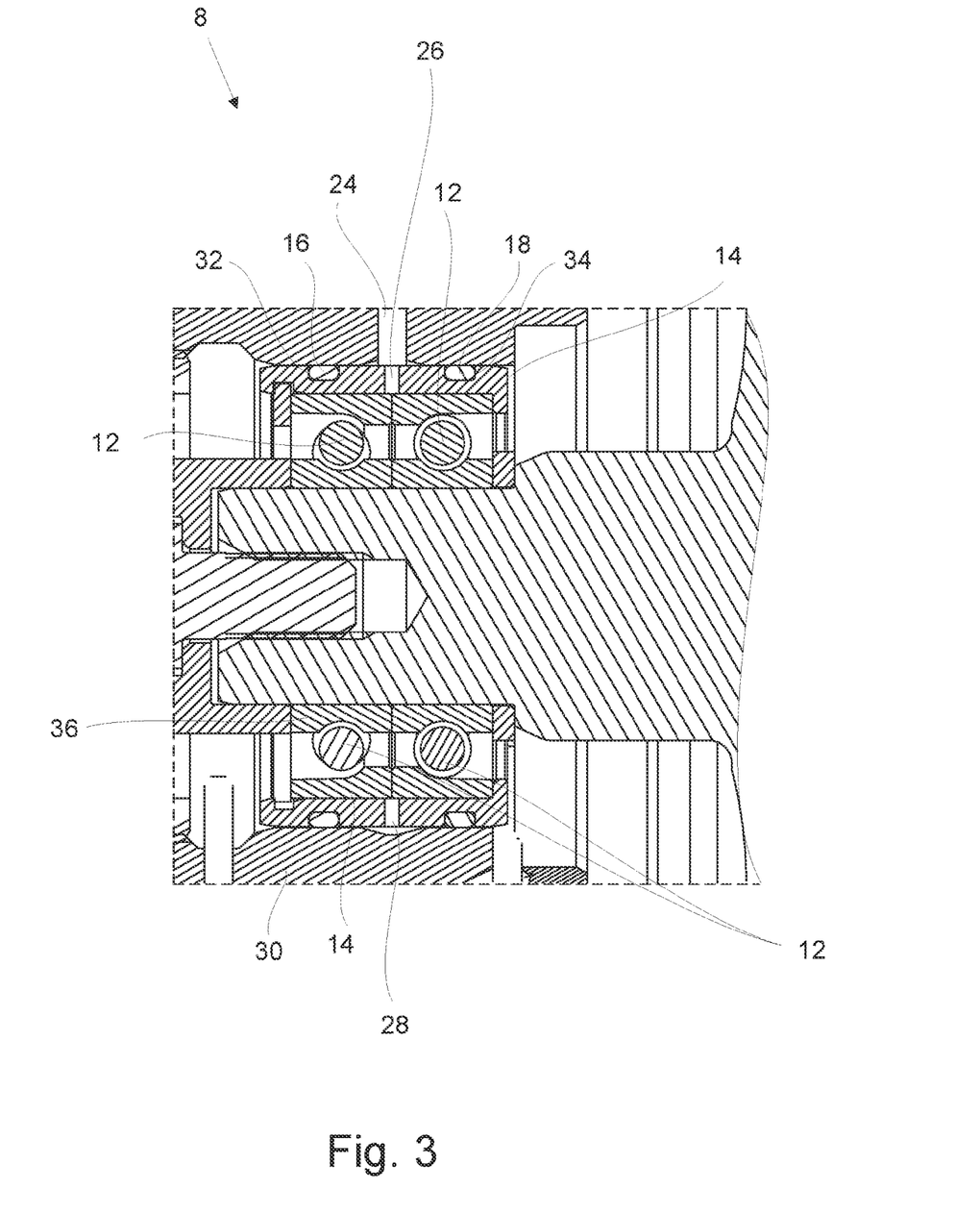
FIG. 3 is a partial cross-sectional view showing the first bearing arrangement of the system of FIG. 1.

Referring to FIG. 2, the system 2 according to one embodiment of the present invention comprises a flywheel 4, a shaft 6, and bearing arrangements 8, 10 located around the shaft on either side of the flywheel 4, i.e. the first bearing arrangement 8 is located on one axial side of the flywheel, and the second bearing arrangement 10 is located on the other side of the flywheel 4 with respect to the axis of the shaft. Each of the bearing arrangements 8, 10 comprises bearings 12 mounted in a race 36 which is fixed rigidly to the shaft 6. An outer diameter of the bearing race 34 is held in a bearing collar 14. The bearing collar 14 is isolated from the flywheel housing 30 by an elastomeric component comprising a first pair of stiff elastomeric rings 16, 18 which are formed of a flurocarbon material. The rings 16, 18 are contained within annular channels 32, 34 formed within bearing collar 14. Thus the rings 16, 18 are located radially outwardly of the bearings 12 with respect to the shaft 6.

The stiffness of the rings 16, 18 is sufficiently high such that in normal use of the system 2, the rings act to dampen any radial movement of the flywheel shaft 6, thus ensuring that the axis 'A' of the flywheel 4 does not move by more than a few microns. This ensures that a mechanical gear drive (not shown), which is connected to an end of the flywheel shaft 6, is maintained sufficiently close to its true centreline, thus ensuring correct operation of the gear drive and no contact between the periphery of the flywheel 4 and its housing 30.

The situation of the bearings 12 and elastomeric rings 16, 18 on either side of the flywheel 4 ensures that interaction of the resonant modes of the flywheel 4 and the housing 30 is prevented.

Figure 4:
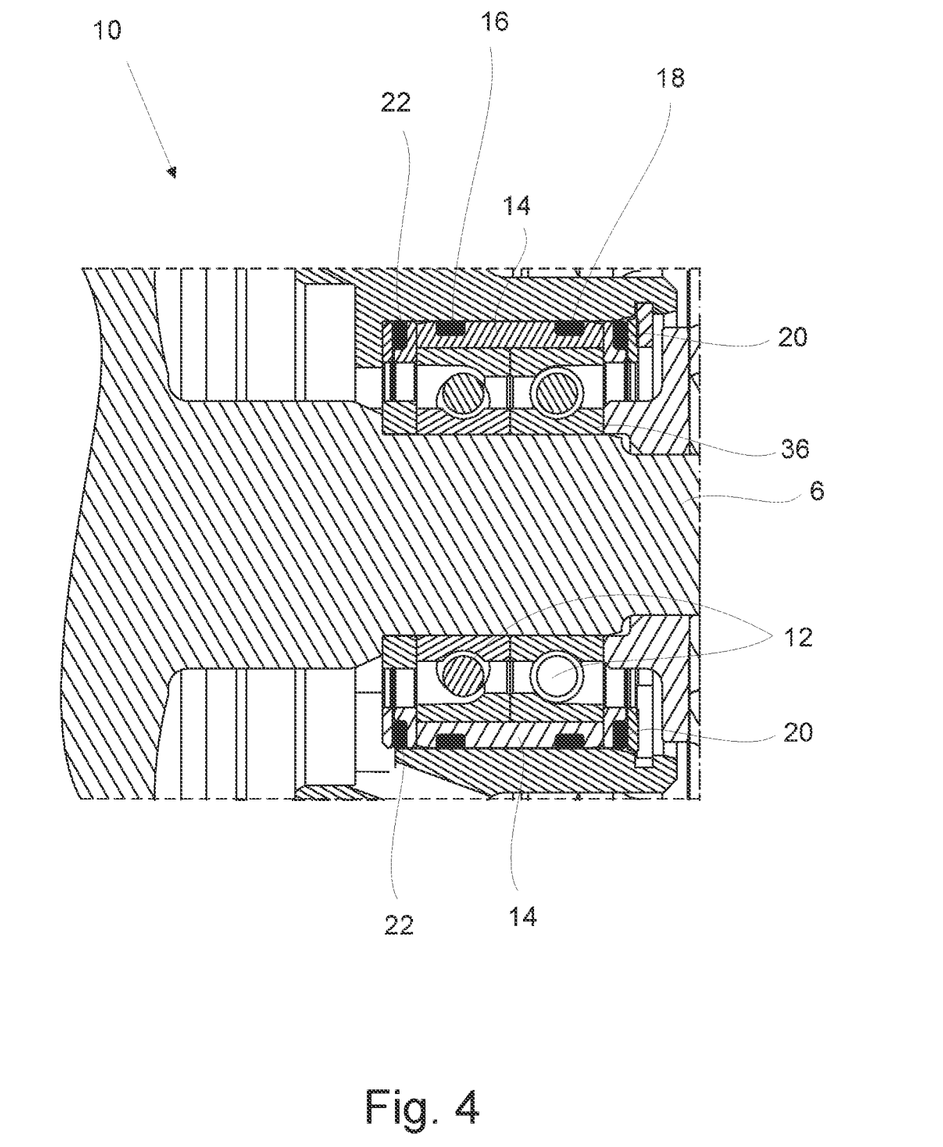
FIG. 4 is a partial cross-sectional view showing the second bearing arrangement of the system of FIG. 1.

One of the bearing arrangements, 10, is restrained in both radial and axial directions with respect to the shaft 6. Axial restraint is provided by a further elastomeric component comprising a second set of elastomeric rings, comprising a pair of elastomeric rings 20, 22 (as illustrated in the right hand side bearing arrangement of FIG. 2, and in detail in FIG. 4).

When the flywheel system 2 is in operation, the elastomeric components provide damping, thereby preventing NVH, and also preventing interaction of resonant modes of the flywheel and of the housing.

An oil transmission passage is provided by a channel 24 in the housing, and channels 26, 28 in the bearing collar 14, to allow a controlled feed of oil (not shown) for lubrication of the bearings. The size of the oil transmission passage, (i.e. the size of the channels 24, 26 and 28), is selected to provide a required damping coefficient of the assembly.

Although in the above embodiment, the elastomeric rings 16, 18 are formed of a flurocarbon material, they may be formed of any suitable elastomer, including natural rubber.

The elastomeric rings 16, 18 may alternatively be located radially inwardly of the bearings 12 with respect to the shaft 6, i.e. between the bearings 12 and the shaft 6.

Figure 5:
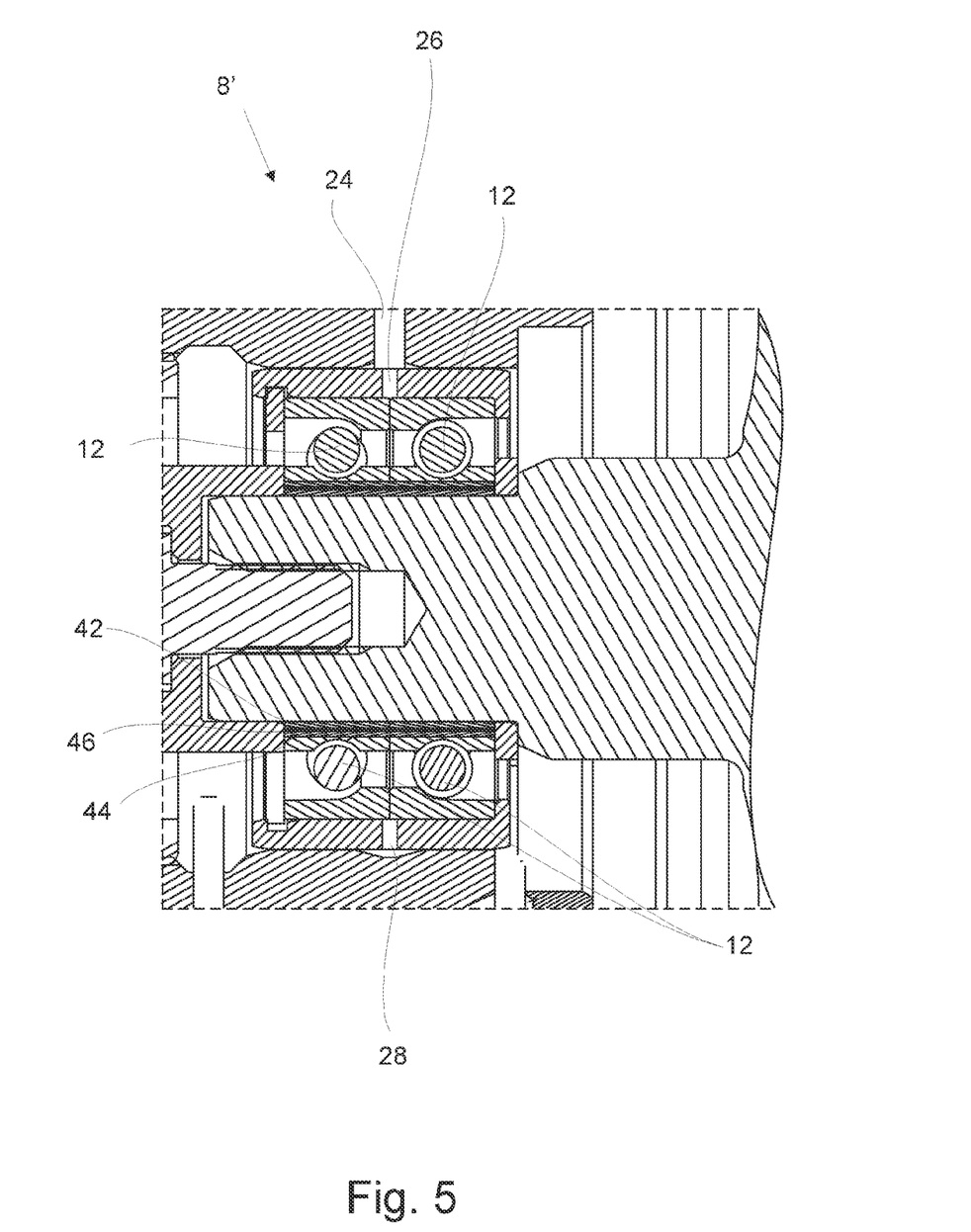
FIG. 5 is a partial cross-sectional view showing a bearing arrangement in accordance with a alternative embodiment of the present invention.

In a system according to an alternative embodiment of the present invention, as illustrated in FIG. 5, the bearing arrangements, one of which (8') is shown in FIG. 5, are mounted to the shaft 6 via a metalastic bush which comprises two concentric steel collars 42, 44 which are separated by an elastomeric component comprising a moulded rubber collar 46. In the embodiment of FIG. 5, the metalastic bush 40 is located between the bearings arrangement 8', 10' and the shaft 6'. However, the bush 40 may alternatively be located between the bearings 12 and the flywheel housing 30.

Figure 6:
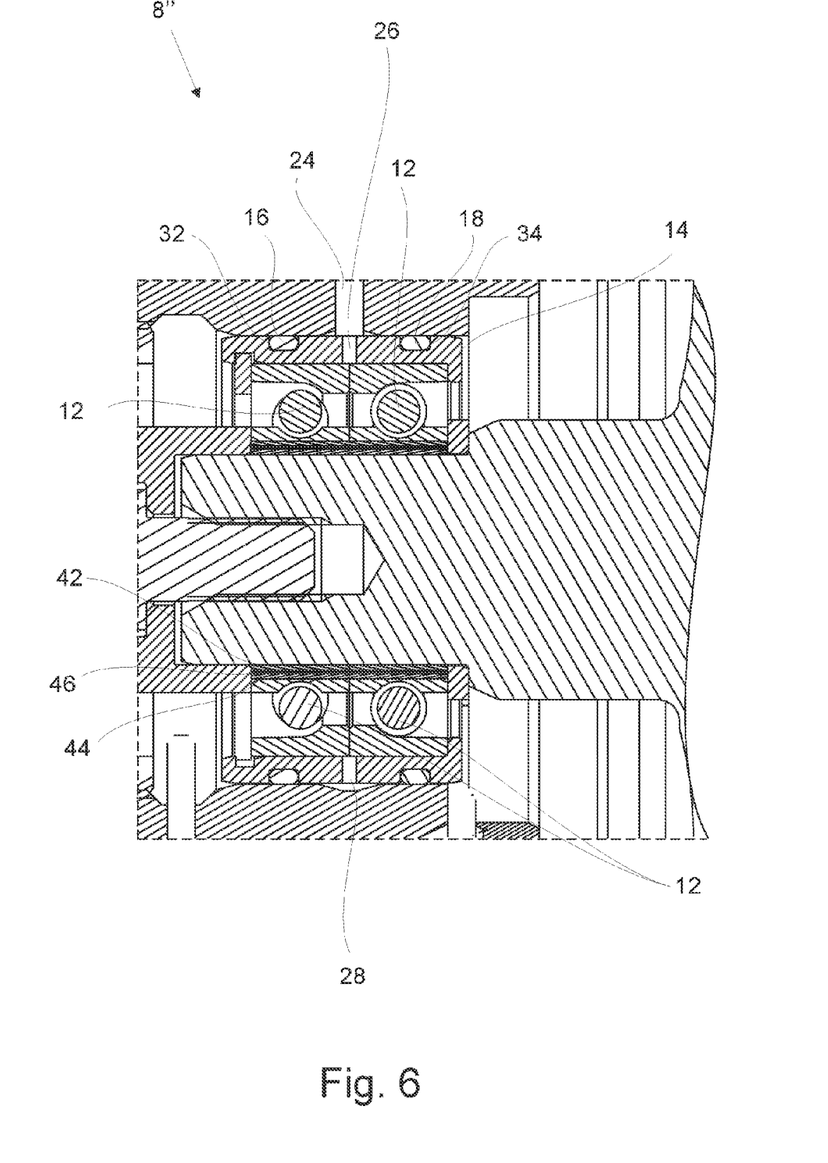
FIG. 6 is a partial cross-sectional view showing a bearing arrangement in accordance with a further alternative embodiment of the present invention.

A further alternative embodiment, as illustrated in FIG. 6, may comprise a bearing arrangement 8" comprising a metalastic bush 40 in combination with a first set of elastomeric rings 16, 18, and/or the second set of elastomeric rings 20, 22, thereby providing a greater degree of radial and/or axial damping. In the embodiment of FIG. 6, the elastomeric rings 16, 18 are located between the bearings 12 and the housing 30, and the bush 40 is located between the bearings 12 and the shaft 6. However, the locations of the bush 40 and the elastomeric rings 16, 18 may be reversed.

In the present embodiment, restraint of the bearing collar 14 is provided by a second pair of elastomeric rings 20, 22. However, in an alternative embodiment, the bearing collar 14 may be produced by moulding an elastomeric element and metal inner and outer rings as a single finished part. This alternative embodiment would be more suitable for mass production.

In further alternative embodiments, the first and/or second set of elastomeric rings may comprise a different number of rings. Furthermore, a second set of elastomeric rings 20, 22 may be provided on both bearing arrangements 8, 10, thereby providing axial restraint on both sides of the flywheel 4.

The invention claimed is:

1. A high speed flywheel system comprising:
a flywheel mounted on a shaft;
a housing, the shaft being mounted on the housing;
a first primary bearing arrangement between the shaft and the housing at a first end of the shaft; and
a second primary bearing arrangement between the shaft and the housing at a second end of the shaft;
wherein the first end of the shaft is not fixed axially, relative to the housing, and the second end of the shaft is substantially fixed axially, relative to the housing, the first and second primary bearing arrangements each having an associated first elastomeric component arranged to keep the respective end of the shaft substantially fixed radially and only the second primary bearing arrangement additionally having an associated second elastomeric component arranged to keep the second end of the shaft substantially fixed axially;
the system further comprising an oil transmission passage comprising a channel in the housing to allow oil to be fed to at least one of the first and second primary bearing arrangements via the oil transmission passage.

2. A high speed flywheel system as claimed in claim 1 wherein the primary bearing arrangements comprises bearings mounted in a race.

3. A high speed flywheel system as claimed in claim 2, wherein the race is fixed to the shaft.

4. A high speed flywheel system as claimed in claim 1 further comprising a bush comprising two concentric metal collars, wherein one of the first elastomeric components comprises a rubber collar located between the metal collars.

5. A high speed flywheel system as claimed in claim 4 wherein the bush is located radially outwardly of one of the primary bearing arrangements with respect to the shaft, between the bearing arrangement and the housing.

6. A high speed flywheel system as claimed in claim 4, wherein the bush is located radially inwardly of one of the primary bearing arrangements with respect to the shaft, between the bearing arrangement and the shaft.

7. A high speed flywheel system as claimed in claim 1, wherein each primary bearing arrangement comprises a bearing mounted in a race, wherein the system further comprises a bearing collar and wherein one of the first elastomeric components comprises a ring; wherein the ring is located radially outwardly of one of the bearing arrangements with respect to the shaft, between the bearing arrangement and the housing,
and wherein a bush is located radially inwardly of one of the primary bearing arrangements with respect to the shaft, between the bearing arrangement and the shaft.

8. A high speed flywheel system as claimed in claim 1 wherein each primary bearing arrangement comprises a bearing mounted in a race, wherein the system further comprises a bearing collar and wherein one of the first elastomeric components comprises a ring; wherein the ring is located radially inwardly of one of the primary bearing arrangements with respect to the shaft, between the bearing arrangement and the shaft, and wherein a bush is located radially outwardly of one of the primary bearing arrangements with respect to the shaft, between the bearing arrangement and the housing.

9. A high speed flywheel system as claimed in claim 1 wherein the second elastomeric component comprises an elastomeric ring.

10. A high speed flywheel system as claimed in claim 1 wherein each elastomeric component is formed of a fluorocarbon material or natural rubber.

11. A high speed flywheel system as claimed in claim 1 wherein one of the first elastomeric components comprises a ring.

12. A high speed flywheel system as claimed in claim 11 wherein the ring is located radially outwardly of its respective primary bearing arrangement with respect to the shaft, between the bearing arrangement and the housing.

13. A high speed flywheel system as claimed in claim 11, wherein the ring is located radially inwardly of its respective primary bearing arrangement with respect to the shaft, between the bearing arrangement and the shaft.

14. A high speed flywheel system as claimed in claim 11, wherein the system further comprises a bearing collar.

15. A high speed flywheel system as claimed in claim 14 wherein the ring is contained within an annular channel provided in the bearing collar.

16. A high speed flywheel system as claimed in claim 1, wherein the elastomeric components are arranged to prevent contact between a periphery of the flywheel and the housing.

17. A high speed flywheel system as claimed in claim 1 wherein the first elastomeric components and the second elastomeric component are separate components.

18. A high speed flywheel system as claimed in claim 1, wherein the second primary bearing arrangement has two associated second elastomeric components.

19. A high speed flywheel system as claimed in claim 18, wherein the second elastomeric components are positioned one on either side of the second primary bearing arrangement and are arranged to provide axial restraint for the second primary bearing arrangement.

* * * * *